(12) United States Patent
Kurzer et al.

(10) Patent No.: US 6,270,059 B1
(45) Date of Patent: Aug. 7, 2001

(54) PROCESS FOR ENRICHING A LIQUID WITH A GAS AND ENRICHED PRODUCT

(75) Inventors: Fritz Kurzer; Frank Kurzer, both of Osterholz-Sharmbeck (DE)

(73) Assignee: KKB 02 Fluid Production GmbH (DE)

(*) Notice: Subject to any disclaimer, the term of this patent is extended or adjusted under 35 U.S.C. 154(b) by 0 days.

(21) Appl. No.: 09/569,061

(22) Filed: May 10, 2000

Related U.S. Application Data

(60) Division of application No. 09/161,720, filed on Sep. 29, 1998, now Pat. No. 6,105,942, which is a continuation-in-part of application No. 09/057,553, filed on Apr. 9, 1998, now Pat. No. 6,059,270.

(51) Int. Cl.[7] ......................................... B01F 3/04
(52) U.S. Cl. ...................... 261/29; 261/74; 261/119.1; 95/172; 95/247; 426/474
(58) Field of Search ............... 261/29, 36.1, 74, 261/119.1, DIG. 7; 95/172, 247, 266; 96/193, 202, 329; 426/474, 477

(56) References Cited

U.S. PATENT DOCUMENTS

| | | | |
|---|---|---|---|
| 1,808,956 | * 6/1931 | Ketterer | 261/36.1 |
| 2,057,100 | * 10/1936 | Jespersen | 261/29 |
| 2,560,526 | * 7/1951 | Thompson | 261/DIG. 7 |
| 2,720,280 | 10/1955 | Doyle . | |
| 3,113,871 | 12/1963 | Webster . | |
| 3,478,929 | 11/1969 | Cornelius . | |
| 3,877,358 | 4/1975 | Karr | 99/275 |
| 4,211,733 | 7/1980 | Chang | 261/36 |
| 4,235,719 | * 11/1980 | Pearson | 261/36.1 |
| 4,956,080 | * 9/1990 | Josefik | 261/29 |
| 5,006,352 | 4/1991 | Zoltai et al. | 426/67 |
| 5,747,079 | 5/1998 | Hoffman | 426/67 |
| 5,968,421 | 10/1999 | Schattney et al. | 261/49 |
| 6,059,270 | * 5/2000 | Kurzer et al. | 261/29 |
| 6,105,942 | * 8/2000 | Kurzer et al. | 261/119.1 |

FOREIGN PATENT DOCUMENTS

| | | |
|---|---|---|
| 1217343 | 5/1966 | (DE) . |
| 235566A1 | 2/1976 | (DE) . |
| 3923480A1 | 1/1991 | (DE) . |

\* cited by examiner

*Primary Examiner*—C. Scott Bushey
(74) *Attorney, Agent, or Firm*—Christopher H. Lynt

(57) ABSTRACT

A liquid enriched with a high concentration of gas, in particular, water enriched with oxygen, is produced by mixing the gas and liquid in an overpressurized system using a series of pressure reduction containers which sequentially reduce the pressure on the gas-enriched liquid in a slow incremental fashion, thereby allowing a high concentration of the gas to be maintained within the liquid phase.

7 Claims, 2 Drawing Sheets

PROCESS FOR ENRICHING A LIQUID WITH A GAS AND ENRICHED PRODUCT

CROSS-REFERENCE TO RELATED APPLICATIONS

This application is a division of allowed application Ser. No. 09/161,720, filed Sep. 29, 1998, now U.S. Pat. No. 6,105,942, hereby incorporated by reference in its entirety, which was a continuation-in-part of application Ser. No. 09/057,553, filed Apr. 9, 1998, now U.S. Pat. No. 6,059,270, hereby incorporated by reference in its entirety. These applications are related to German application number 197 49 202.4, filed Nov. 6, 1997, and 198 27 613.3, filed Jun. 20, 1998, the subject matter of which is hereby incorporated by reference in its entirety.

FIELD OF THE INVENTION

The invention relates to a liquid enriched with an extraordinarily high concentration of a gas phase component, and in particular, to water enriched with a high concentration of oxygen gas. The invention further relates to a method of enriching a liquid with a gas so as to obtain a high concentration of the gas within the liquid. In particular, the invention relates to a method of enriching water with a high level of gaseous oxygen. The invention further relates to apparatuses for enriching a liquid with a high concentration of a gas, and in particular, for enriching water with an elevated concentration of gaseous oxygen.

BACKGROUND OF THE INVENTION

It is known that all of the vital functions contributing to the human metabolism require oxygen, and that it is necessary for the human organism to obtain sufficient oxygen through breathing. However, methods have been developed for purposefully supplying the human organism with an amount of oxygen in addition to that obtained through breathing. Such additional oxygen can be supplied for generally improving normal function and wellbeing, on the one hand, but can also be used particularly as a treatment, or as a supplement to treatments for sick individuals. To accomplish this, it is known to use enriched water, that is, water enriched with free, gaseous oxygen.

In one known method of enriching water with gaseous oxygen, oxygen gas is supplied to water via a perlite disposed on the bottom of an open container that is filled with water. Perlite is a porous volcanic mineral. The oxygen is forced through the perlite at low pressure and bubbles through the water in the container before subsequently escaping into the environment or the atmosphere at the liquid-air interface. Passing the oxygen through the water causes it to be enriched with oxygen. As a result of this enrichment, the concentration of "free" oxygen in the water is about 35 mg/L. The term 'free', as it is used here with respect to the oxygen gas, and throughout this application with respect to free gas, is meant to include gas molecules which are released within the liquid phase as their physical interactions with liquid molecules in the fluid are broken.

This known method has some drawbacks, however. For example, the concentration of free oxygen obtained in the water is only about 35 mg/L, which is a relatively low amount. Furthermore, after bubbling through the liquid, a portion of the supplied oxygen escapes into the atmosphere and cannot be reused, thereby resulting in a high gas consumption for the amount of oxygen-enriched water that is actually obtained.

While there may be beneficial effects to the human organism of using water enriched at the known, relatively low concentrations described above, better treatment results could be obtained if higher levels of oxygenation could be achieved. Further, if less oxygen were lost to the atmosphere, the costs of producing oxygen-enriched water could be reduced.

Besides use for human consumption, for general well being and in therapeutic methods as referred to above, oxygen enriched water has other known uses, such as in water purification processes, cleaning processes, and the like. Further, it may be desirable to enrich other liquids with other gases for other uses, at higher concentrations than are currently achievable, and with less wasted gas during the process of enrichment.

As discussed above, therefore, a need has existed for water more highly enriched with oxygen, a method of achieving the higher enrichment, and an apparatus for achieving the higher enrichment. A need has further existed for other liquid gas-enriched products, as well as a method and apparatus for producing them.

SUMMARY OF THE INVENTION

It is a principal object of the present invention to meet the above-described needs and overcome the above-described drawbacks of the prior products, methods, and apparatus.

In that regard, it is an object of the invention to provide an enriched fluid comprising a liquid phase having dispersed therein a high concentration of a gas phase component that is maintained within the liquid under normal storage conditions. In this enriched liquid, the concentration of free gas is over 60 mg/L. In particular, the liquid phase is water, and the gas phase component is oxygen.

It is also an object of this invention to provide a method for enriching a liquid with gas such that the liquid has a high concentration of free gas, while simultaneously reducing the amount of gas consumed in the process of enrichment.

It is a further object of the invention to provide an apparatus for enriching a liquid with a gas such that the liquid has a high concentration of free gas, and gas consumption is reduced.

It is also a particular object of the invention to provide a method and an apparatus for producing water enriched with a high concentration of oxygen gas, this concentration being higher than those previously achieved in the art, while simultaneously reducing the amount of oxygen consumed.

The objectives stated above are accomplished in accordance with the invention by first enriching a liquid with a gas in a closed overpressure system, and following the enriching of the liquid, abruptly expanding the gas-enriched liquid by subjecting it to an abrupt drop in pressure. In the invention, because the gas is supplied to the liquid in a closed overpressure system, any excess gas is prevented from escaping from the liquid into the open atmosphere, and can be recaptured for subsequent use in further enrichment of the liquid. According to a further aspect of the invention, any excess gas that does not enrich the liquid during a first enriching process, remains inside the overpressure system, and can advantageously be reused at least once in the enriching process.

Supplying the gas to the liquid under pressure effects an enrichment of gas in the liquid. This enrichment occurs under high pressure, and is primarily accomplished during the supply of gas to the liquid. The gas is maintained in the liquid by means of a close spatial connection or physical "bond" between the molecules of the gas and the liquid. However, the high concentration of free gas in the liquid is not obtained merely by introducing the gas into the liquid. Rather, the high concentration of free gas in the gas-enriched liquid is achieved by creating a rapid drop in pressure, for example, by conducting the gas-enriched liquid out of the overpressure system into a lower pressure area where abrupt expansion occurs. The gas-enriched liquid then expands because of the lowered pressure. As the gas-enriched liquid expands, the gas molecules that were physically bonded to the liquid molecules in the overpressure system are released. This release increases the concentration of free gas in the liquid, e.g., free oxygen in water.

By using the novel practice of this invention, liquids enriched with concentration of over 60 mg/L, and preferably, over 140 mg/L of free gas may be obtained. Most preferably, the amount of free gas is over about 200 mg/L. These concentrations were previously obtained using the gas-enrichment processes known in the prior art.

According to one embodiment of the invention, gas enriched liquid is conducted out of the closed overpressure system which can be selectively set to effect an accelerated, practically immediate expansion. This immediate expansion generates an especially high concentration of free gas in the liquid. It has been determined that the rapidity of expansion and the attainable concentration of free gas are directly proportional, so that the faster the expansion, the higher the concentration of free gas that is obtained in the enriched liquid. Therefore, by setting the rate of expansion of the gas-enriched liquid, the desired concentration of free gas in the liquid may advantageously be selected.

According to another embodiment of the invention, the gas-enriched liquid that is conducted away from the closed overpressure system is expanded in a lower pressure system provided with an outlet, with a pressure drop occurring along the path of this transfer due to the different pressures dominating the overpressure system and the lower pressure system. This lower pressure system comprises one or more pressure release vessels or containers in series, each having at least one outlet. Where the lower pressure system comprises more than one pressure release vessel, the gas enriched liquid and headspace gas move from one vessel to another via the one or more outlets. As the gas-enriched liquid is conducted through this pressure drop, it expands, causing the gas in the liquid to be freed. The pressure ratios in the closed overpressure system and the lower pressure system having the outlet can be set, preferably so as to depend on one another. For example in a preferred embodiment, the pressure in the closed overpressure system can be set in the range of about 1.5 to 6 bar, while the pressure in the lower pressure system having the outlet can be set in the range of about 0.2 to 2.5 bar. The pressures are set so that a distinct pressure drop occurs in the gas-enriched liquid moving between the two systems, leading to an expansion of the liquid during which the gas is released.

In one aspect of this preferred embodiment of the invention, the liquid is moved from the closed overpressure system into a lower pressure system comprising a pressure release vessel having an outlet. During the transfer, this lower pressure system is maintained at the same pressure as the pressure in the closed overpressure system. After this transfer to the outletted vessel at a constant pressure, the pressure in that container is subsequently reduced in small increments. As a result, there is no rapid expansion of the fluid; rather it is allowed to expand in slow, incremental fashion. Once the liquid is moved to the pressure release vessel having an outlet, the pressure in that vessel is then decoupled or cut off from the closed overpressure system with respect to the pressure ratios between them, and the pressure in the lower pressure system is reduced slowly. In the process, the gas-enriched liquid expands slowly.

During the slow expansion of the fluid, the gas is not liberated in the form of small bubbles inside the liquid to the same extent as occurs with the abrupt expansion. More of the gas molecules remain tightly bonded to the liquid, and as a result, the gas remains in the liquid longer. This property is especially evident when the gas-enriched liquid is filled into a container such as a tank. When stored in such containers even over long periods of time, for example several weeks, the gas is not liberated. The gas is also not liberated when the liquid is transported in such containers and exposed to jarring motions.

In this preferred embodiment, the pressure in the lower pressure system having the outlet is reduced to a pressure of, for example, one bar. The reduction in pressure to this level ensures the slow expansion of the liquid with only a small-scale release of the gas dissolved therein. The pressure in this system can be reduced until it closely corresponds to the external or atmospheric pressure outside of the pressure system. The system is then effectively depressurized. Under these static conditions, the liquid can then be conducted out of the pressure system and filled into containers such as tanks. Once the pressure vessel is emptied, it may again be subjected to the elevated pressure level of the closed overpressure system and refilled with more gas-enriched liquid from that first phase of the process. In effect, the pressure system having an outlet operates as a pressure lock that enables transfer of portions of the liquid volume out of the closed pressure system into a system, which exposes the gas-enriched liquid to a pressure gradient, thereby stabilizing the fluid system. As a result, the amount of free gas contained in the liquid product is increased.

In another aspect of this embodiment, the apparatus includes a reservoir container for holding a liquid, which is connected to a high-pressure gas supply line to form a closed overpressure system. Closure or blocking mechanisms, such as sliding valves, are provided in the lines connecting the reservoir container and the gas supply source.

The reservoir container is further connected to conduct gas-enriched liquid to a chamber having a pressure that is lower in comparison to the reservoir container, which connection can be opened and closed selectively. A pressure regulator at the high-pressure gas supply can be used to adjust the pressure in the closed overpressure system.

According to another aspect of the apparatus, a lower portion of the container holds the liquid and the gas is supplied to an upper portion of the container. An external enrichment arrangement in the form of a closed loop is provided, having a first line connected to the container for drawing gas from the upper portion; a second line connected to the container for drawing liquid from the lower portion; a junction for combining the first and second lines into a common line carrying both liquid and gas; a supply device for receiving the liquid and gas from the common line and performing a first mixing to form a gas-enriched liquid; and a swirling device connected to an output of the supply device for performing a second mixing and providing gas-enriched liquid back to the container at an upper portion thereof.

Instead of the external enrichment arrangement closed loop where the liquid is enriched with gas outside the reservoir container, an internal enrichment device, i.e., internal to the container, may be provided, according to an alternate embodiment. Likewise, there could be separate containers for unenriched liquid and the gas-enriched liquid instead of the one container, according to an alternative embodiment.

According to further aspects of the invention, the supply device is a centrifugal pump, the swirling device is a cyclone swirling chamber in which a net, screen or the like can be additionally installed, and the container has an overpressure release valve at a top thereof. The centrifugal pump may include a high-pressure injector.

According to another aspect of the invention, adjustable valves, e.g., sliding valves, are provided on the first line, the second line and between the swirling device and the container, to control the flow of gas, liquid and gas-enriched liquid through the enrichment arrangement closed loop. Pressure sensing devices, pressure sensors, are also provided in the common line and at the output of the supply device, for example, as well as at the container, for sensing the respective pressures. Adjustment of the valves may also be used to obtain the desired pressures as measured by the pressure sensors.

According to a further aspect of the invention, the chamber having a pressure that is lower in comparison to the reservoir container comprises a hollow ball valve, having slot-shaped openings which can be opened and closed, on a line leading from the container to the chamber. A pressure sensor measures the pressure inside the hollow ball valve. Pressure and flow speed sensors are provided at an outlet from the hollow ball valve, along with a gas measurement sensor for detecting the amount of free gas in liquid thereat.

The sensors and valves may form part of an automatic control system operated by a digital computer, for example, whereby desired levels of gas-enrichment may be set and conveniently monitored, based on pressures and flows in the apparatus. Alternatively, the system may be manually adjusted by manual actuation of the valves based on manual reading of the sensor' indications.

According to an aspect of the invention, the gas and the liquid are mixed in the supply device, and in the process, the liquid is enriched with the gas in the above-described manner, such that the gas is bonded to the liquid. That is, a measurably high concentration of "free" gas in the liquid has not yet been attained. The gas-enriched liquid is returned to the reservoir container following the mixing process. The chamber in which the dominating pressure is lower is comparison to the reservoir container is connected to the reservoir container to receive liquid therefrom. The connection is embodied such that it can be opened and closed. When opened, gas-enriched liquid exits the reservoir container and enters the chamber due to the different pressure ratios. The gas-enriched liquid is expanded according to the invention, and the gas that was previously bonded in the liquid is freed.

Another preferred embodiment of the invention is characterized by an apparatus in which the liquid is moved from the closed overpressure system into a lower pressure system comprising a series of pressure reduction containers used to lower the pressure of the gas-enriched liquid. This embodiment comprises a supply device for supplying the gas to the liquid, a reservoir for the gas-enriched liquid; and a connection between the reservoir and the supply device to form a closed overpressure system. In addition, the lower pressure system includes at least one pressure reduction vessel or container whose internal pressures can be set at different levels to create a pressure gradient over the direction of flow of the gas-enriched liquid. Each of the pressure reduction containers may be closed or otherwise controlled with a cut-off mechanism.

In this embodiment, the lower region of the first pressure reduction container is connected to the reservoir container to allow passage of the gas-enriched liquid. this connection is fitted with a closure means that allows the passage of the gas-enriched liquid to be controller or blocked. The liquid level in the reservoir container is maintained at a volume level that is higher than the level in the pressure container. The difference in hydrostatic pressure allows movement of the gas-enriched liquid from the reservoir container to the pressure reduction container. This is advantageous in that a pump or other motion-based device is not required to move the liquid.

As the gas-enriched liquid moves through the system, the conditions in the pressure reduction container are maintained so as to prevent a decrease in pressure, which would result in release of the gas. To maintain these static conditions, the pressure reduction container is directly connected to the source of the gas, for example an external gas tank as previously described. This gas supply source is an integral component of the closed overpressure system, which also includes the reservoir container. The connection to the gas supply source provides a means of equalizing the pressure between the reservoir container and the pressure reduction container before the gas-enriched liquid is moved into the pressure reduction container. Once this equal pressure has been established, the connection to the gas supply source is closed, and the block between the reservoir container and the pressure reduction container is removed. Because of the difference in volume levels, a portion of the liquid in the reservoir container is transported by hydrostatic pressure out into the pressure reduction container. This liquid is advantageously not subject to any changes in pressure during this transfer process, and therefore no bound gas in the liquid is release.

After the pressure reduction vessel is filled, the input connection from the reservoir vessel is closed, and the gradual pressure reduction begins. A pressure discharge valve is preferably situated in the pressure reduction container, most preferably in the upper region. This pressure discharge valve is used to reduce the overpressure in the pressure reduction container at a slow, incremental pace. A manometer may be disposed within the pressure reduction container to monitor the rate of pressure change.

The pressure reduction container is further equipped with a liquid outlet to allow collection of the gas-enriched liquid into storage containers once the pressure in the pressure reduction container has been reduced to atmospheric pressure.

In a further preferred embodiment, the reservoir container and the gas supply of the overpressure system may be connected to a lower pressure system comprising a series of two pressure reduction containers. These are in turn connected to each other by a gas-pressure equalization line, which can be blocked by means of a pressure discharge valve.

Gas and gas-enriched liquid can thus alternately be supplied from either the reservoir container or the gas supply into either of these pressure reduction containers. By using this series of pressure reduction vessels, the volume of liquid that can be processed by the apparatuses of the invention is increased significantly.

In another aspect of this embodiment, a liquid-level regulating device is provided to monitor the level of the gas-enriched liquid in the reservoir container. This device is advantageously used to ensure that a sufficient liquid volume is always present in the reservoir container, to permit continuous filling of the one or more pressure reduction containers according to the invention.

Alternatively, more than two pressure reduction containers may be used in sequence. The volume capacity of the reservoir container should however be of a correspondingly increased dimension to provide adequate input to the pressure reduction vessels. Transfer of the gas-enriched liquid through the system of pressure reduction vessels is accomplished in stepwise fashion. The first vessel is brought to the same pressure as the reservoir container by introduction of the supply gas, and is then filled with liquid. The pressurized gas fills the headspace above the liquid in the pressure reduction vessel. Any free headspace gas present in this first pressure reduction vessel as a result of the overpressure in the reservoir is then introduced to the next pressure reduction vessel in the series via the gas-equalization line when the pressure discharge valve is opened. An advantage of this arrangement is that no additional supply of gas is necessary for building the pressure in the remaining pressure reduction vessels in the sequence once the pressure has been adjusted in the first vessel. Rather, gas that has been used in one of the pressure reduction vessels can also be used in the other pressure reduction vessels, thereby enabling consumption of gas to be maximized.

The apparatus of the invention can preferably be operated continuously, thereby allowing continuous removal of gas-enriched liquid from the one or more pressure reduction containers.

Regardless of which embodiment of the pressure-adjusting apparatus is used, the reservoir container may be embodied as a tank, for example, that is initially filled, in the absence of pressure, to about ⅔ capacity with the liquid. The gas intended to enrich the liquid is introduced into the upper third of the tank. The gas is introduced under high pressure, and the tank, along with adjacent enrichment components, form a closed overpressure system. Water, for example, is used as the liquid, and oxygen supplied from a commercially available, high-pressure oxygen source is supplied as the gas. The pressure in the closed overpressure system can be adjusted with a pressure regulator provided at the oxygen source, as well as with a pressure relief valve provided on the reservoir container tank.

As mentioned above, the liquid and the gas can be mixed by, for example, a supply device disposed in the container. However, in the preferred embodiment, the reservoir container is connected via a closed loop system to conduct liquid and gas to an external supply device, in which they are mixed together, resulting in the bonded enrichment of the liquid with the gas. As already mentioned, in an embodiment, the supply device is preferably a centrifugal pump having a high-pressure injector, which is connected via a closed loop system to the reservoir container. A centrifugal pump having a high-pressure injector is capable of suctioning and further conducting a gas in addition to a liquid, or a liquid/gas mixture. The centrifugal pump suctions liquid and gas, and swirls them together as they pass quickly through the pump. Thus, the liquid is enriched with the gas, but this is a bonded enrichment; in other words, a close (strong) bonding of the gas to the liquid is achieved.

According to an aspect of the invention, on the suctioning side of the centrifugal pump, the loop system includes a gas line that exits the upper region of the reservoir container, and a liquid line that exits the lower region of the reservoir container, the lines being guided to a common line directly in front of the centrifugal pump. The gas line and the liquid line are connected to the reservoir container such that they can remove gas and liquid, respectively, from the different regions of the reservoir container. Because these lines are guided together to a common line, a liquid/gas mixture is supplied to the centrifugal pump. A vacuum is simultaneously formed in the gas line, for example, due to the suction of the liquid through the centrifugal pump. A suction of the gas through the centrifugal pump is therefore simultaneously achieved. On the discharge side of the centrifugal pump, a swirling device may be disposed in a line between the centrifugal pump and the reservoir container. A further mixing of liquid and gas can advantageously be achieved with the swirling device. A cyclone swirling chamber, for example, in which a net, a screen or the like can additionally be installed, can be used as a swirling device. As the gas-enriched liquid passes through the device, it is swirled, effecting further mixing of the liquid and the gas. An advantage of this embodiment is that the degree of enrichment of the gas in the liquid is increased. The swirling device simultaneously represents a pressure-reducing device. While a vacuum exists on the suction side of the supply device, causing the media of gas and liquid to be auctioned into the supply device, an overpressure exists on the other side of the supply device. This overpressure can be reduced in the swirling device. This is achieved, for example, by an effective widening of the cross section of the line between the supply device and the container in the swirling device.

According to an exemplary embodiment of the invention, the chamber having a lower pressure than the reservoir container comprises a hollow ball valve that is disposed in a line for gas-enriched liquid leading out of the reservoir container. The interior of the hollow ball valve forms a pressure system having an outlet. Inside its hollow ball, the hollow ball valve has a space in which a specific pressure can be realized, thereby allowing the ball to open or close the valve outlet. The pressure dominating here is significantly less than the pressure in the overpressure system of the reservoir container. The pressure drop is achieved because when the valve is in the closed position, the interior of the hollow ball valve is cut off from overpressure system. To allow entry of the gas-enriched liquid, the hollow ball valve is only opened slightly, forming a very narrow, nozzle-shaped opening. The openings for the passage of the liquid, which are formed between the interior of the hollow ball valve and the lines that lead away when the valve opens, are preferably slot-shaped. Because of this slot-shaped feature, the liquid is forced rapidly into the interior of the hollow ball valve under high pressure. The gas-enriched liquid enters the interior of which is under a substantially lower pressure, and can expand abruptly. According to the invention, during this expansion, the gas that was previously bonded to the liquid is converted into "free" gas in the liquid. This free gas in the liquid is a physically bonded gas that nevertheless forms no chemical compound with the molecules of the liquid, and is therefore "free". The hollow ball valve can be opened to a greater or lesser extent, which widens the slot-like opening between the interior of hollow ball valve and the lines leading away, so the pressure inside the hollow ball valve can thereby be set directly. To monitor the pressure, a pressure sensor (manometer) is also preferably disposed inside the hollow ball valve. A pressure sensor that measures and indicates the pressure dominating in the reservoir container is preferably associated with the reservoir container, as well.

In a preferred embodiment, a flow-speed measurement device is disposed in a line that carries away gas-enriched liquid, downstream of the hollow ball valve in the flow direction of the liquid. In addition to the different pressures in the reservoir container and the inside of the hollow ball valve, the flow speed of the liquid through the hollow ball valve is a variable on which the concentration of the free gas in the liquid is dependent. This flow speed is monitored with the flow-speed measuring device. The value of the flow speed is a function of the set pressures and the size of the openings. Moreover, a gas measurement device, with which the concentration of free gas in the gas-enriched liquid can be measured and monitored, is disposed in the line that carries away the gas-enriched liquid, downstream of the hollow ball valve in the flow direction of the liquid. For optimum measurement by this gas measurement device, a specific liquid flow speed is set, which is monitored with the flow-speed measurement device.

A line leading out of the hollow ball valve terminates in an outlet that can be opened and closed, and out of which liquid enriched with free gas can be removed. The liquid is drawn off, for example, into diffusion-tight containers.

A gas-enriched liquid, in particular, water enriched with oxygen, which can be produced by the exemplary method and apparatus according to the invention, is advantageously characterized by a concentration of free gas of over 60 mg/L. In particular, water enriched in accordance with the invention may have a concentration of free oxygen of over 140 mg/L, and most particularly over 200 mg/L.

DETAILED DESCRIPTION OF THE PREFERRED EMBODIMENT

The invention will now be described in more detail by way of example with reference to the embodiment shown in the accompanying figure. It should be kept in mind that the following described embodiment is only presented by way of example and should not be construed as limiting the inventive concept to any particular physical configuration.

Figure 1:
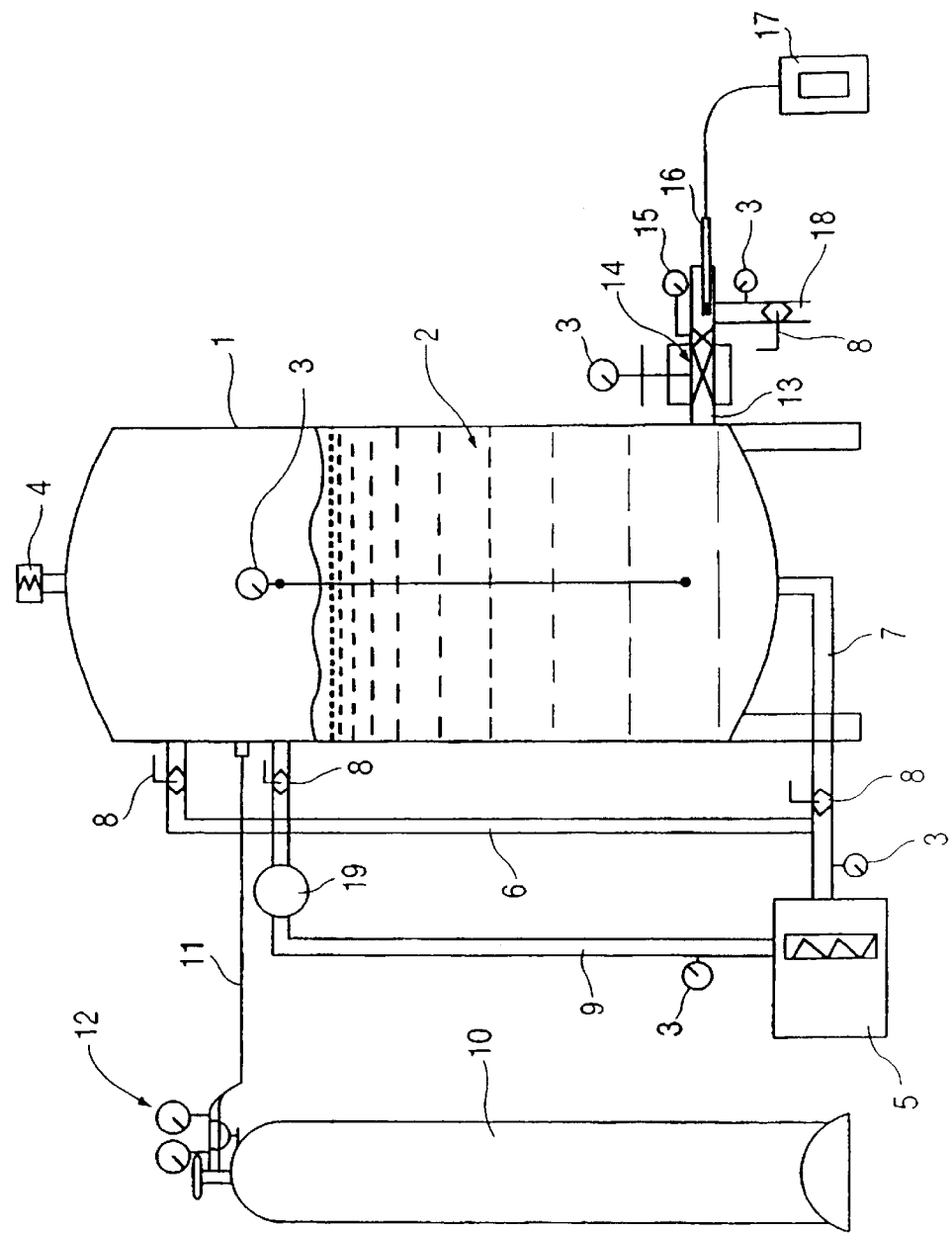
FIG. 1 illustrates an exemplary embodiment of an apparatus according to the invention for enriching a liquid with a gas.

The apparatus illustrated in FIG. 1 comprises a closed reservoir container 1 for holding a gas-enriched liquid 2. Reservoir container 1 is provided with a pressure sensing and indicating device (manometer) 3 for displaying the pressure in reservoir container 1, and with an overpressure valve 4. Reservoir container 1 is connected to an enrichment arrangement, a closed loop system for enriching a liquid with a gas. The enrichment loop includes a supply device 5 for mixing a gas with a liquid. Supply device 5 comprises, for example, a centrifugal pump. On the intake side of the centrifugal pump supply device 5, a common line having a manometer 3 is provided for feeding a liquid and a gas to the pump 5 from the reservoir container 1. Gas line 6 leads away from the upper region of reservoir container 1, and liquid line 7 leads away from the lower region of reservoir container 1, these lines joining at the common line feeding the supply device 5 immediately upstream of supply device 5 in the flow direction. An adjustable slide valve 8 is disposed in liquid line 7, upstream of the joining point with gas line 6, and an adjustable slide valve 8 is provided in gas line 6, upstream of the joining point with liquid line 7.

A line 9 for a gas/liquid mixture leads back to reservoir container 1 from supply device 5, so that the supply device 5 is disposed in a closed loop. A swirling device 19 is disposed in line 9 between the supply device 5 and the reservoir container 1. This swirling device 19 can be, for example, a cyclone swirling chamber. A slide valve 8 is likewise disposed in line 9 downstream of the swirling device 19.

The gas that is used to enrich the liquid is stored in the upper region of reservoir container 1. The gas can be introduced into reservoir container 1 via a line 11 from an external gas tank 10, for example. Gas tank 10 is a high-pressure gas tank having a pressure regulator 12 in line 11 at the outlet of the tank 10. The pressure of the gas in reservoir container 1, and therefore the closed system formed by reservoir system 1, supply device 5 and lines 6, 7 and 9, can be set to a desired overpressure value (e.g., a pressure greater than atmospheric pressure) with pressure regulator 12. For example, a pressure of 1.5 to 6.0 bars may be set. Overpressure relief valve 4 on container 1 also serves to control the pressure in the container 1 by preventing the pressure from exceeding a certain set value, for example.

A line 13 for carrying gas-enriched liquid away from the reservoir container 1 is connected to the lower region of reservoir container 1. Line 13 leads to a chamber 14 in which the dominating pressure is lower than the dominating pressure in the reservoir container 1. This chamber is embodied by a schematically-illustrated hollow ball valve 14, for example, which is inserted into line 13. A manometer 3 associated with hollow ball valve 14 measures the pressure inside hollow ball valve 14.

Further components are disposed in line 13, downstream of hollow ball valve 14 in the flow direction. In particular, a flow-speed measurement device 15 and the sensor 16 of a gas-measurement device 17 are disposed in line 13. Line 13 ultimately terminates in an outlet 18, with which a manometer 3 and a slide valve 8 are associated.

The apparatus shown in the drawing is used for enriching a liquid with a gas according to the following method. A quantity of water is supplied to the container 1 absent pressure to a level of, for example, two-thirds full. The gas is then supplied to container 1 to establish an overpressure environment therein to a pre-selected pressure. The gas and liquid now stored in reservoir container 1 at a selected overpressure are supplied via lines 6 and 7, respectively, to the common line and thereby to supply device 5. The two media, liquid and gas, are mixed in supply device 5. In the process, the liquid is enriched with the gas such that the gas is bonded to the liquid. The concentration of free gas, that is, only physically-bonded gas, in the liquid, however, is still low at this point. The liquid and gas are mixed further in the swirling device 19 disposed in line 9, and the further mixed liquid and gas is supplied back to reservoir container 1. In this way, the liquid and gas are mixed in a closed loop overpressure system comprising the reservoir container 1, the supply device 5, the swirling device 19, and lines 6, 7 and 9. Since the system is closed, any excess gas which does not bond with the liquid will be advantageously contained in container 1 and be usable for further enrichment according to an object of the invention.

Subsequent to enrichment through the closed loop overpressure system, liquid 2 enriched with bonded gas is provided to the interior of hollow ball valve 14 via line 13. The liquid 2 is forced at high pressure through slot-like, narrow openings between the interior of hollow ball valve 14 and line 13, as a result of the different pressures in reservoir container 1 and hollow ball valve 14. As the gas-enriched (bonded) liquid 2 enters the lower pressure interior of hollow ball valve 14, it expands abruptly, thereby freeing the gas bonded in the liquid 2. Because of the abrupt expansion, concentrations of free gas in liquid 2 of over 60 mg/L can be attained.

For example, if water is enriched with oxygen, a concentration over 200 mg/l can be achieved according to the above-described apparatus and method. The expansion in hollow ball valve 14 is monitored by flow-speed measurement device 15 and the gas concentration is monitored by gas-measurement device 17 with sensor 16. The liquid enriched with free gas can be removed from the apparatus at outlet 18, and, for example, can be drawn off into transportable containers.

Figure 2:
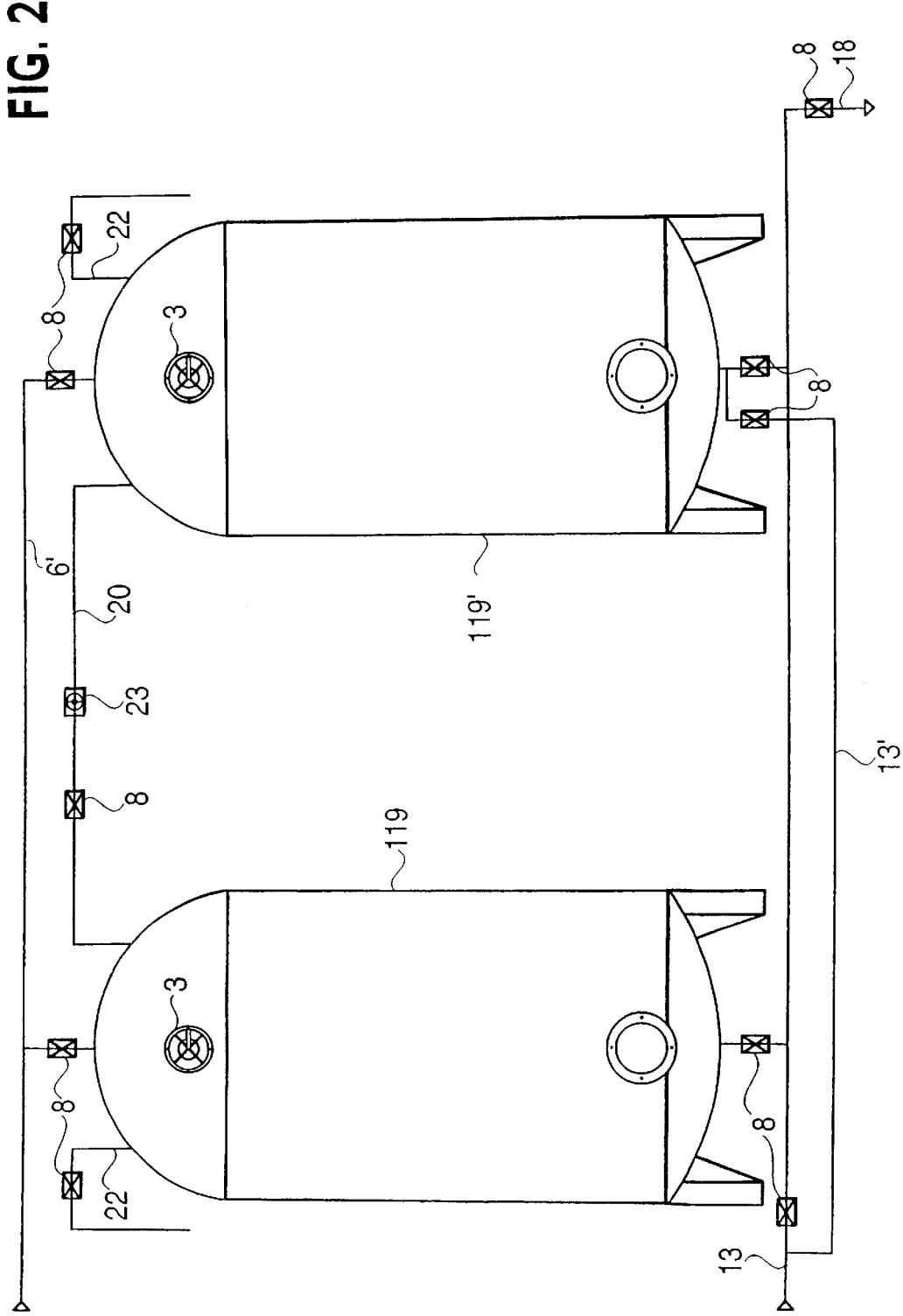
FIG. 2 illustrates the serial pressure reduction apparatus comprising the lower pressure system that is an alternate embodiment of the invention.

FIG. 2 shows an alternative exemplary embodiment of an apparatus for executing the method of this invention, which incorporates at least one pressure-reduction container. In this embodiment, pressure-reduction containers 119 and 119' are disposed downstream of the reservoir container 1 (not shown in FIG. 2). Both containers are connected to the reservoir container by way of liquid flow line 13, which terminates in the lower region of each container. Gas line 6' is connected to the reservoir container 1, and further connects the upper regions of the pressure reduction vessels 119 and 119' to permit gas flow between them. Sliding valves 8 are inserted into both liquid flow line 13 and gas flow line 6' as blocking elements for flow control. Liquid flow line 13 includes a branch 13', which leads to the second pressure reduction container 119'. This branch establishes a liquid conducting connection between the second pressure reduction container 119' and the reservoir container 1. This connection is maintained even if the liquid-conducting connection between the first pressure reduction container 119' and reservoir container 1 is broken by operation of the respective sliding valve 8. Line 13 terminates in an outlet 18.

The two pressure reduction containers 119, 119' are also connected to one another, by way of a gas equalizer line 20, so as to conduct gas. Gas equalizer line 20 terminates in the upper region of each of the pressure reduction containers 119 and 119', respectively. A sliding valve 8 and a gas flow-through indicator 23 are disposed in the gas equalizer line 20. In addition, each pressure-reduction container 119 and 119' has a pressure-discharge valve 22 in this upper region.

The two pressure reduction containers 119 and 119' are disposed spatially below the height of the liquid level in reservoir container 1.

In this alternative embodiment as is shown in FIG. 2., it is intended that the release of gas in the liquid be prevented. In contrast to the first embodiment of the invention, the gas dissolved in the liquid is not to be released during the expansion of the liquid. Here, the gas is allowed to remain bonded to the liquid, so the liquid is particularly stable after it has been filled into containers and during transport.

In this alternative embodiment, the reservoir container 1 (not shown) is under a specific overpressure. When the sliding valve 8 is opened, the first pressure reduction container 119 is filled with a gas by way of gas line 6', and thus brought under the same overpressure. The pressure ratios are read using manometer 3. After this pressure has been generated, the sliding valve 8 in gas line 6' is again closed. The sliding valves 8 in line 13 are then opened. Because of the hydrostatic pressure and the arrangement of pressure-reduction container 119 below the height of the liquid level in reservoir container 1, liquid 2 flows through line 13 into the first pressure reduction container 119. The liquid flows into this pressure reduction container 119 until an equal liquid level is attained between reservoir container 1 and pressure reduction container 119, with residual gas preferably remaining in the pressure reduction container 119.

Afterward, sliding valves 8 in line 13 are again closed. When sliding valve 8 in the upper region of container 119 is open, the gas that is still present is conducted out of this container and into the second pressure-reduction container 119' by way of gas-equalizer line 20. While the gas is being carried off, the pressure drops in the first pressure-reduction container 119. The gas is carried off slowly and incrementally, so the pressure reduction is effected in a correspondingly slow fashion. An abrupt expansion of the liquid in pressure-reduction container 119 is prevented; instead, the liquid expands slowly. The gas escapes from pressure-reduction container 119 until the desired low pressure has been established in this container. Sliding valve 8 in gas-equalizer line 20 is then closed, and the sliding valves 8 provided in line 13 between pressure-reduction container 119 and outlet valve 18 are opened. The liquid can now be carried off via outlet 18 and, for example, filled into tanks.

While the liquid is being carried off from pressure-reduction container 19, pressure reduction container 119' is simultaneously filled with liquid from reservoir container 1 in a corresponding manner. Previously, this pressure-reduction container 119' has been brought under the same high pressure as in reservoir container 1 with the gas from pressure-reduction container 119 and, possibly, with additional gas, via gas line 6'. Liquid is subsequently introduced into pressure-reduction container 119' via branch 13'. To reduce the pressure in this pressure-reduction container 119', gas-equalizer line 20 is re-opened, whereupon gas remaining in pressure-reduction container 119 can be introduced into the first pressure-reduction container 119.

These alternating steps of filling and emptying the pressure-reduction containers 119, 119' can be effected continuously. This permits a continuous removal of liquid at outlet 18. A liquid-level regulating device, not shown in detail, in reservoir container 1 ensures that a liquid level necessary for producing the necessary hydrostatic pressure ratios is always present in reservoir container 1.

With a corresponding increase in the volume of reservoir container 1, further pressure-reduction containers similar 119, and 119' can be provided.

The operation may be performed manually, or under the control of a automatic control system including a digital computer, for example, as would be apparent to one skilled in the art. It will be apparent to one skilled in the art that the manner of making and using the claimed invention has been adequately disclosed in the above-written description of the preferred embodiment taken together with the drawing.

It will be understood that the above described preferred embodiment of the present invention is susceptible to various modifications, changes, and adaptations, and the same are intended to be comprehended within the meaning and range of equivalents of the appended claims.

For example, instead of the external enrichment arrangement, an internal to the container enrichment arrangement could be used. Further, besides the hollow ball valve, other ways could be used for effecting the abrupt pressure drop, as would be apparent to one skilled in the art.

What is claimed is:

1. A method of making a liquid enriched with a high concentration of dissolved gas, comprising:

a. providing a closed reservoir container with a quantity of liquid to a pre-selected level;

b. providing a quantity of pressurized gas to the closed reservoir container to establish a pre-selected pressure within the container;

c. enriching the liquid in the closed reservoir container with the pressurized gas using a mixing device, to form a gas-enriched liquid having gas molecules physically bonded to the liquid; and d. expanding the gas-enriched liquid in a lower pressure system comprising a series of pressure reduction vessels, such that the pressure in the series of pressure reduction vessels is initially equal to that of the closed reservoir and is subsequently reduced in slow incremental fashion, thereby forming a liquid enriched with a high concentration of dissolved gas;

wherein the method further comprises transporting the gas-enriched liquid from a first pressure reduction vessel into another pressure reduction vessel in the series, maintaining the same pressure in the respective pressure vessels during transport;

wherein the initial pressure in the first one of the pressure reduction vessels in the series is created by the flow of an overpressure of gas from the closed reservoir container into the first pressure reduction vessel; and wherein the flow of an overpressure of gas into the first one of the pressure reduction vessels in the series is closed off from the closed reservoir container, and the overpressure of gas in the first pressure reduction vessel is subsequently directed through an outlet to a next pressure reduction vessel in the series.

2. The method of claim 1, wherein the pressure in the lower pressure system is reduced to a final pressure of about one bar.

3. The method of claim 1, wherein the pressure in the lower pressure system is reduced to a final pressure which is equal to the pressure of the external environment.

4. The method of claim 1, wherein the initial pressure of gas in the first one of the pressure reduction vessels in the series is equal to the pressure in the closed reservoir container, this pressure being subsequently reduced in slow in incremental fashion to allow expansion of the gas-enriched liquid.

5. The method of claim 1, wherein the overpressure of gas from each pressure reduction vessel in the series of pressure reduction vessels is directed through an outlet to a next vessel in the series.

6. The method of claim 5, wherein the pressure in a pressure reduction vessel in the series of pressure reduction vessels is reduced to a final pressure of about one bar.

7. The method of claim 5, wherein the pressure in the final pressure reduction vessel in the series of pressure reduction vessels is reduced to a final pressure which is equal to the pressure of an external environment.

* * * * *